Oct. 28, 1924.
W. R. McGOWEN
1,513,714
BUMPER BRACKET
Filed March 13, 1924
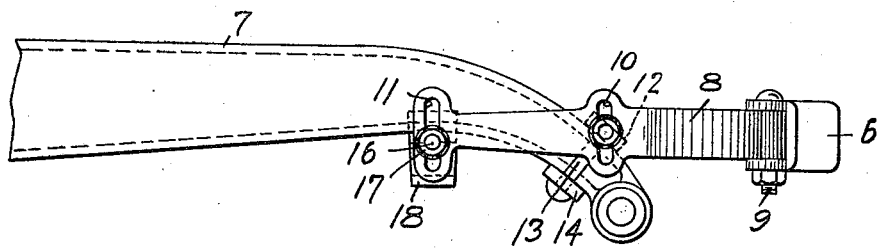
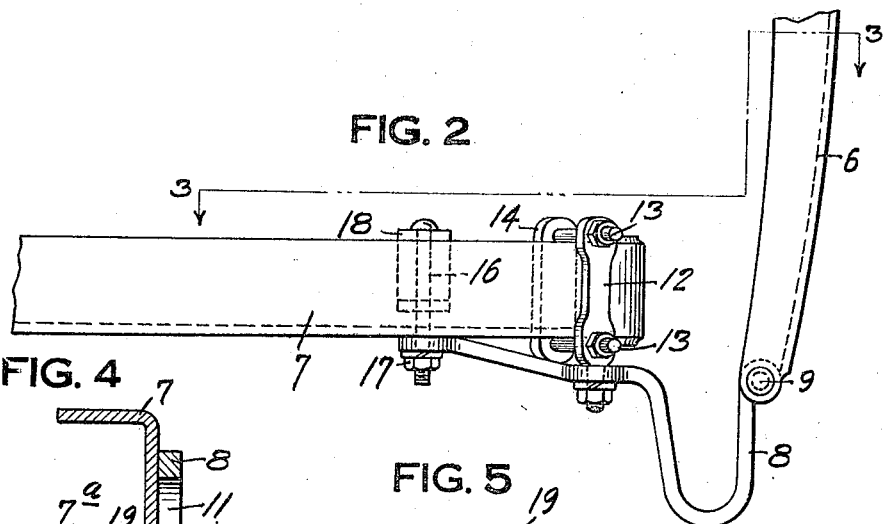
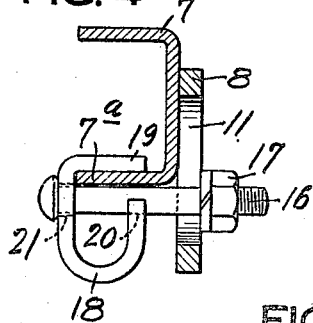
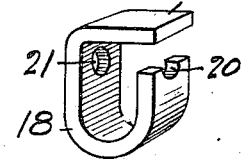
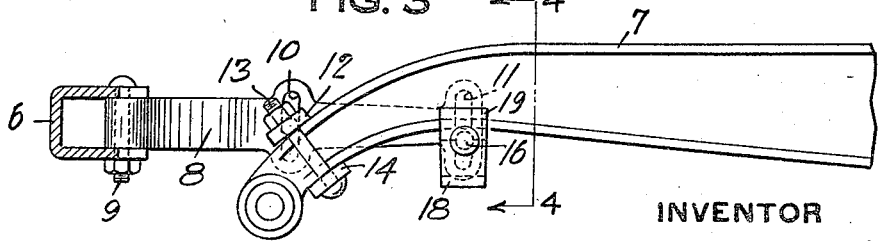
INVENTOR
William R. McGowen
By Kay, Totten & Brown
Attorneys Patented Oct. 28, 1924.

1,513,714

UNITED STATES PATENT OFFICE.

WILLIAM R. McGOWEN, OF CHICAGO, ILLINOIS.

BUMPER BRACKET.

Application filed March 13, 1924. Serial No. 698,922.

*To all whom it may concern:*

Be it known that I, WILLIAM R. McGOWEN, a citizen of the United States, and resident of Chicago, in the county of Cook and State of Illinois, have invented a new and useful Improvement in Bumper Brackets; and I do hereby declare the following to be a full, clear, and exact description thereof.

My invention relates to bumper brackets for vehicles, and particularly to a means for securing such brackets to the frame of a vehicle.

One object of my invention is to improve upon the hook bolt type of fastening heretofore employed for attaching bumper brackets to the channel frames of automobiles.

Another object is to simplify and improve generally the construction and operation of devices of this character.

In carrying out my invention I provide what may be termed a hook plate, of general U-form, having one end bent at right angles and extending across the space between the legs of the U-member, in position to rest upon the lower flange of the channel frame. A bolt extends through the plate at a distance below the hook sufficient to accommodate the said flange therebetween. The other leg or hook of the device engages the underside of the bolt. The plate may be made as wide as desired, thus giving an extended contacting surface against the edge of the flange, thereby reducing the tendency to buckle or otherwise damage the flange, and having greater strength than the usual hook bolt. Furthermore, the hook plate serves as a rigid support for a bolt in parallel relation to a flat surface.

One form which my invention may take is shown in the accompanying drawing, wherein Fig. 1 is a view, in side elevation, of a portion of an automobile frame to which my device is applied; Fig. 2 is a plan view thereof; Fig. 3 is a view taken on the line 3—3, Fig. 2; Fig. 4 is a sectional view taken on the line 4—4 of Fig. 3; and Fig. 5 is an enlarged detail view of the hook member which I employ.

While I herein describe my invention as applied to automobile frames of the channel type, it is apparent that it may be applied to frames of other types and used in other relations than that herein shown.

Referring to Figs. 1 and 2, I show a portion of a bumper bar 6, and a portion of one of the side frames 7 of an automobile, it being understood that a similar arrangement is provided at the opposite side of the vehicle.

A strap member 8 has an eye portion through which a bolt 9 extends for attaching the strap to the bumper bar 6, the bar 6 being provided with vertically spaced flanges as shown in Fig. 1.

The strap 8 is provided with a slot 10 intermediate its ends and an elongated opening 11 at its rear end. A plate 12 is disposed across the forward portion of the frame 7, and is provided beyond its outer enlarged portion with a screw threaded portion which extends through the slot 10 and is clamped to the strap 8 by a nut as shown more clearly in Figs. 1 and 2, depending upon the vertical adjustment desired. The plate 12 is held in place by bolts 13 that extend also through a plate 14 upon the underside of the frame 7, as shown in Figs. 1 and 3. A bolt 16 extends through the slot 11 and is provided with a nut 17 that may be loosened or tightened to effect vertical adjustment of the rear end of the strap 8. These features of adjustment, however, constitute no portion of the present invention, they being claimed in a separate application about to be filed.

The bolt 16 is supported by a clip or hook member 18, shown more clearly in Fig. 5. This hook member is relatively wide, to provide an extended engaging surface for the lower flange 7ª of the frame 7. The end 19 of the member 18 is bent in such position that it rests upon the flange 7ª and the end of the member 18 is recessed slightly at 20 to provide a seating for the bolt 16, and such end may be extended to abut against the under side of the flange 7ª. The bolt 16 extends through a hole 21 in the member 18 and has its head of such diameter that the upper portion thereof lies opposite the edge of the flange 7ª, so that when the nut 17 is tightened no shearing effect will be produced upon the member 18. Also, it is desirable to make the nut 17 of sufficient width to avoid shearing strains on the bracket member 8.

Instead of employing but one bracket member 18, I may employ two, substituting the second one for the bracket members 12 and 14.

From the foregoing it will be seen that I provide a fastening of such form that the frame is not likely to be distorted and weakened, and one which is conveniently applied and not likely to become displaced. It will be seen that even should the nut 17 become loosened somewhat, the bolt 16 and bracket member 19 would still be maintained in operative position, the hole 21 and recess 20 of the member 18 serving to maintain the bolt 16 and the member 18 in proper alignment.

Various changes in detail may be made without departing from the spirit and scope of the invention as defined in the accompanying claims.

I claim as my invention:

1. A hook member of substantially U form having one leg bent inwardly in a horizontal plane and provided with a hole through said leg portion at a point below said bend, the other leg terminating at a point below the said bend and disposed in position to abut against a bolt extending through said hole.

2. A hook member formed of a plate bent to substantially U form and having an inward projection adjacent to the upper end of one of its legs, the other one of said legs terminating at a point directly below the said inturned portion, and means for securing a bolt to the first-named leg.

3. A fastening device for attachment to channel bars comprising a transversely extending portion adapted to rest upon a flange of a channel bar, a vertically extending portion provided with a bolt hole adjacent to said first-named portion, and a reversely bent portion terminating below said transverse portion, the extremities of said transverse portion and said reversely bent portion being in substantially vertical alignment.

4. A fastening device comprising a plate of substantially U form having a transversely bent portion adapted to rest upon a supporting member, a depending portion and a reversely bent portion terminating at a distance below the first-named portion but in alignment therewith, and means on said plate for supporting a bolt.

5. A fastening device for attachment to a frame member comprising a plate of substantially U-form and having an inward projection adjacent to the upper end of one of its legs, which is adapted to rest upon said frame member, the other leg of said plate being shorter than the first-named leg and terminating in spaced relation to the underside of said frame member, the first-named leg portion being provided with a hole so positioned that upon the insertion of a bolt therethrough the bolt will abut against the underside of said frame member, and the second named leg portion serving as a support for holding the bolt in alignment with the underside of said frame member.

6. A device for securing bumper brackets to the channel frames of automobiles, comprising a bracket member having an inturned end supported by one flange of said frame, and having a U-shaped portion attached thereto, said portion being provided with a bolt hole adjacent to the underside of said flange and the free end of said portion terminating at a point below the horizontally disposed portion, a bolt extending through said hole and past said free end of the U-shaped member, a second bracket member disposed upon the opposite side of said channel bar, and a nut for engaging said bolt and said second bracket member to clamp said bracket members against said frame, the upper edges of the bolt head and of the nut extending above the lower surface of the said flange to prevent shearing of the said bracket members.

In testimony whereof I, the said WILLIAM R. McGOWEN, have hereunto set my hand.

WILLIAM R. McGOWEN.